United States Patent [19]
Fox

[11] 3,790,971
[45] Feb. 12, 1974

[54] CUSPIDOR AND DENTAL CONSOLE FOR USE THEREWITH

[75] Inventor: Shirl S. Fox, Menlo Park, Calif.

[73] Assignee: Dental Designs, Menlo Park and Palo Alto, Calif.

[22] Filed: Apr. 12, 1971

[21] Appl. No.: 132,980

[52] U.S. Cl. .................................. 4/263, 4/262
[51] Int. Cl. ............................................ A61c 17/04
[58] Field of Search ............ 4/263, 264, 265, 266, 1

[56] References Cited
UNITED STATES PATENTS

| | | | |
|---|---|---|---|
| 3,636,633 | 1/1972 | Fuller et al. | 32/22 |
| 1,649,183 | 11/1927 | Pieper | 4/263 |
| 3,521,307 | 7/1970 | Slouka et al. | 4/264 |
| 655,051 | 7/1900 | Browne | 4/263 |
| 666,718 | 1/1901 | Weber | 4/263 |
| 3,281,868 | 11/1966 | McGouirk | 4/263 |
| 3,359,575 | 12/1967 | Nielsen | 4/263 |
| 3,530,513 | 9/1970 | Maurer et al. | 4/1 |

FOREIGN PATENTS OR APPLICATIONS

| | | | |
|---|---|---|---|
| 624,518 | 4/1927 | France | 4/263 |
| 220,725 | 7/1909 | Germany | 4/265 |

OTHER PUBLICATIONS

Crane Co. Catalog, Vol. 1915, Number 8 page 94

Primary Examiner—Peter Feldman
Assistant Examiner—Donald B. Massenberg
Attorney, Agent, or Firm—Flehr, Hohbach, Test, Albritton & Herbert

[57] ABSTRACT

A cuspidor for use in a dental console in which the cuspidor is in the form of a bowl having an open top side in which the bowl has a bottom wall and an upwardly extending outwardly inclined annular side wall with a drain opening formed in the bottom wall to permit liquid to drain from the bowl and with an additional opening formed in the bowl which faces in a direction so that a liquid introduced through the additional opening will exit as a liquid stream striking the side wall in a generally tangential direction to cause the stream to swirl around the bowl before exiting through the drain opening.

6 Claims, 3 Drawing Figures

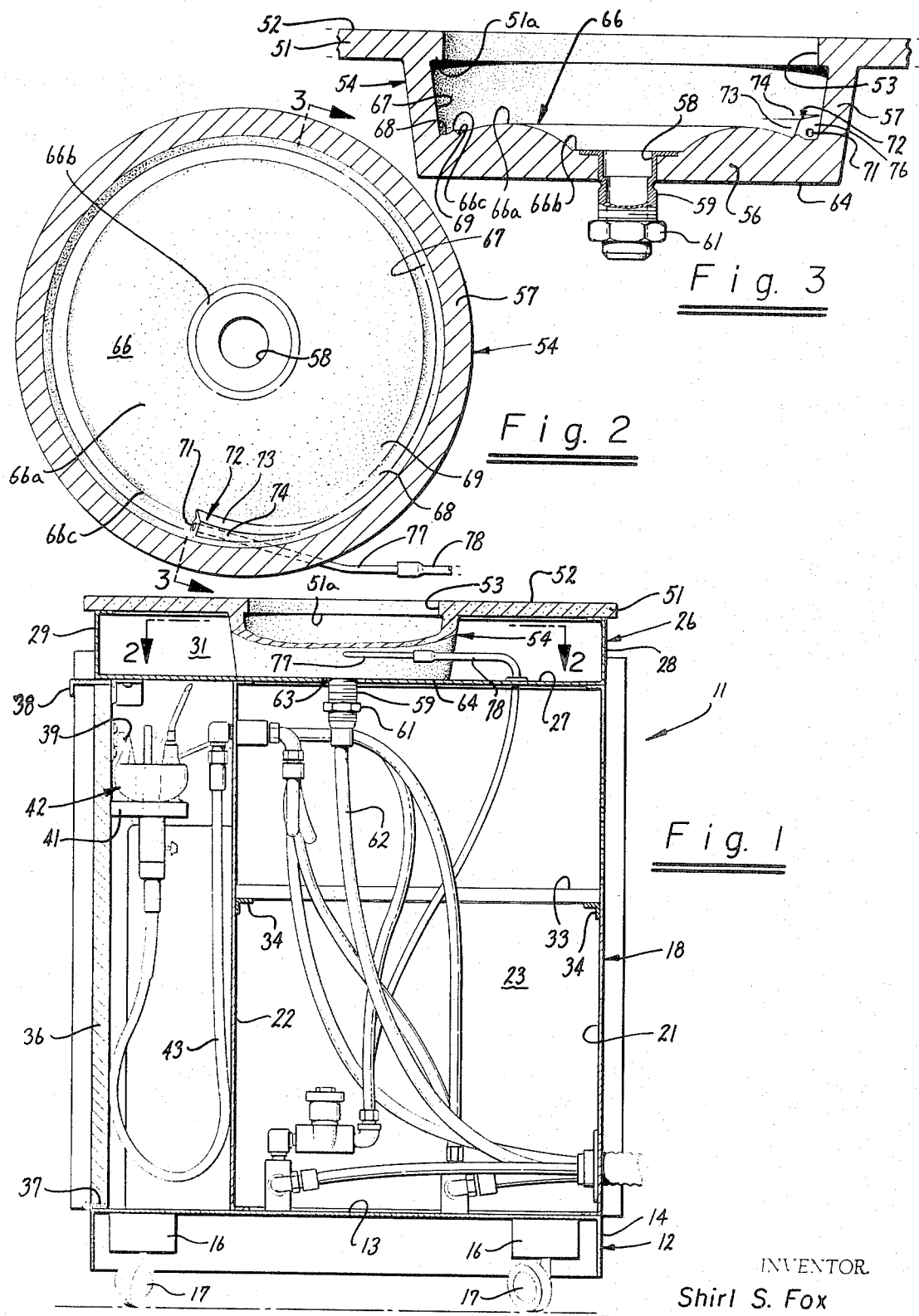

CUSPIDOR AND DENTAL CONSOLE FOR USE THEREWITH

BACKGROUND OF THE INVENTION

In copending application Ser. No. 889,471, filed Dec. 31, 1969, there is disclosed a dental console which is provided with a counter having a large hole or opening therein and in which a separate large cuspidor is provided below the hole in the counter. In order to introduce a liquid into the bowl, it is necessary to insert a small pipe between the counter and the top of the bowl. It has been found that this gives a rather unattractive appearance to the bowl and also makes it more difficult to clean the bowl. There is, therefore, a need for a new and improved cuspidor which can be utilized in a dental console.

SUMMARY OF THE INVENTION AND OBJECTS

The cuspidor for use in a dental console comprises a bowl having an open top side. The bowl is formed with a bottom wall and an upwardly and outwardly inclined annular side wall. The bottom wall is formed with a drain opening to permit liquid in the bowl to drain from the bowl. The bowl is provided with an additional opening which faces in a direction so that liquid introduced through the opening will exit from the additional opening as a stream which strikes the side wall in a generally tangential direction so that the water will swirl around the bowl before exiting through the drain opening in the bowl. The bowl is provided with an inwardly extending lip which is formed on the upper extremity of the side wall which serves to prevent the stream from passing out of the top opening of the bowl as it swirls around the bowl. The cuspidor is formed in such a manner so that it can be incorporated as an integral part of a counter of a dental console.

In general, it is an object of the present invention to provide a cuspidor which can be utilized with a dental console.

Another object of the invention is to provide a cuspidor of the above character which has an integral inlet opening.

Another object of the invention is to provide a dental console having a counter in which the cuspidor is formed as a part of the counter.

Another object of the invention is to provide a dental console of the above character in which an extension of the counter serves to form an overhanging lip for the cuspidor.

Another object of the invention is to provide a cuspidor and a dental console for use therewith which have a particularly attractive appearance.

Additional objects and features of the invention will appear from the following description in which the preferred embodiment is set forth in detail in conjunction with the accompanying drawing.

BRIEF DESCRIPTION OF THE DRAWING

FIG. 1 is a cross-sectional view of a dental console and cuspidor incorporating the present invention.

FIG. 2 is a cross-sectional view taken along the line 2—2 of FIG. 1.

FIG. 3 is a cross-sectional view taken along the line 3—3 of FIG. 2.

DESCRIPTION OF THE PREFERRED EMBODIMENT

The dental console shown in FIG. 1 is generally of the type described in copending application Ser. No. 889,471, filed Dec. 31, 1969 (now U.S. Pat. 3,636,633). As described therein, the dental console is in the form of a cabinet 11 which consists of a base 12 formed of a suitable material such as sheet metal. The base consists of a planar top wall 13 with a depending skirt 14. Four blocks 16 are secured to the bottom surface of the top wall 13 and have mounted therein caster assemblies 17 of a conventional type. The cabinet 11 also consists of a box-like enclosure 18 which is secured to the base 12. The enclosure 18 is provided with a pair of spaced parallel upstanding end walls 21 and 22 and spaced parallel upstanding side walls, of which only side wall 23 is shown.

The cabinet also includes a framework 26 which is secured to the enclosure 18. The framework 38 is provided with a bottom wall 27 and spaced parallel end walls 28 and 29 and spaced parallel side walls, of which side wall 31 is shown.

A shelf 33 is mounted with the enclosure 18 and is supported by brackets 34. The cabinet 11 is provided with a hinged or swinging door 36 which has a hinge 37 at its lower end that is secured to the base 12 so that the door 36 can be swung between open and closed positions. The door is provided with a handle 38 at its upper end which is adapted to be grasped by the hands so that the door can be readily moved between two positions. Door retaining assemblies 39 are provided for limiting the outward movement of the door 36. A small shelf 41 is carried by the door 36 adjacent the upper end thereof and is adapted to carry a plurality of dental instruments 42 as shown in FIG. 1. The dental instruments 42 are provided with a plurality of fittings and tubes which are connected in the manner shown and as described in copending application Ser. No. 889,471, filed Dec. 31, 1969, and which are connected to an umbilical cord 43 which is connected to the cabinet.

A counter 51 is mounted upon the framework 26. The counter 51 is provided with a planar top surface 52 and has a large, generally circular opening 53 formed therein and centered generally with respect to the sides and ends of the rectangular counter 51. A cuspidor 54 is formed integral with the counter and is disposed below the opening 53 in the counter. The cuspidor 54 is in the form of a bowl with an open top side which is formed with a bottom wall 56 and an integral upwardly extending, outwardly inclined curved annular side wall 57. The bottom wall 56 is provided with a centrally disposed drain opening or hole 58 in which there is mounted a conventional fitting 59. The fitting 59 is connected by a coupling 61 to a drain tube 62. The fitting 59 extends through a hole 63 provided in the wall 27. The bottom surface 64 of the bottom wall 56 is planar as shown, whereas the top surface 66 of the bottom wall is curved also as shown. The top surface is provided with a generally convex portion 66a which is curved in cross-section as shown in FIG. 3 so that it slopes downwardly to the drain opening 58 and also slopes downwardly toward the adjacent annular side wall 57. The top surface 66 is provided with a planar portion 66b through which the hole 58 is formed and which adjoins the portion 66a. The surface 66 is provided with an annular upstanding triangular portion 66c which is provided between the inner surface 67 of the annular side wall 57 and the convex portion 66a so there are formed first and second annular troughs or grooves 68 and 69 between the inner surface 67 of the side wall 57 and the convex portion 66a of the surface 66.

The cuspidor 54 is formed with an additional hole or opening 71 which faces in a direction so that a liquid passing therefrom will strike the side wall surface 67 in a generally tangential direction so that the water will swirl around the bowl. This swirling motion is facilitated by the smooth annular surface 67 which is inclined slightly outwardly. The water will also have a tendency to travel in the troughs 68 and 69 until they are filled to a level so that they will spill over the curved portion 66a of the surface and then pass downwardly into the drain fitting 59.

The cuspidor 54 is formed with a protuberance 72 through which the opening 71 extends. As can be seen particularly from FIGS. 2 and 3, the protuberance is formed in the recess 68 so that the opening 71 is in axial alignment with the recess 68. The protuberance 72 is provided with an outwardly curved and an upwardly and outwardly inclined surface 73 which has a radius that is substantially less than that of the surface 67 and has its lower extremity in general alignment with the recess 69. The protuberance 72 is also provided with an additional surface 74 which is inclined inwardly and downwardly from the horizontal as can be seen particularly in FIG. 3. The protuberance is also provided with a front, generally planar vertical surface 76 through which the opening 71 extends. A fitting 77 formed of a suitable material such as metal is inserted into the hole or opening 71 as shown particularly in FIG. 2 and is connected to a tube 78. The tube 78 is connected to a suitable source of water as described in copending application Ser. No. 889,471, filed Dec. 31, 1969 (now U.S. Pat. No. 3,636,633).

The counter 51 is provided with a portion 51a which extends over the top of the cuspidor 54 and forms an inwardly extending annular lip with respect to the annular surface 67.

In order to provide an attractive appearance for the dental console, it is desirable that the counter 51 and the cuspidor 54 be formed of the same type of material as, for example, a synthetic marble. In fabricating the counter 51 and the cuspidor 54 of such a material, the counter 51 and the cuspidor 54 are formed of separate parts and then are cemented together with a plastic as shown in FIG. 3 to provide an integral counter and cuspidor.

Operation and use of the dental console with the cuspidor may be briefly described as follows. When the dentist wishes to utilize the dental console, the water supply is turned on which causes a stream of water to be forced under pressure through the opening 71 which produces a stream jetting therefrom that generally strikes the annular surface 67 of the side wall 57 in a tangential direction to cause it to rotate or swirl around the bowl. It has been found that by increasing or decreasing the flow of water, it is possible to control the height to which the water will rise on the surface 67. The inwardly extending lip serves to prevent the water from travelling upwardly over the side wall and also serves to prevent the water from splashing out of the cuspidor. The water will, therefore, travel in a relatively thin film over the surface 67 and in the troughs 68 and 69. As soon as the troughs 68 and 69 are filled, the water will travel in a thin film over the surface 66 and pass downwardly through the drain 59. The protuberance 72 does not interfere with the travel of the water because of the surfaces 73 and 74 provided on the protuberance. The protuberance will cause the water travelling in the trough 68 to be moved into the inner trough 69 after which it will pass through the drain opening. From the foregoing, it can be seen that the entire inner surface of the cuspidor is generally covered with a thin film of water which ensures that the cuspidor will be continuously cleansed by the thin film of water as it is being utilized by the dental patient. In addition, the dental console gives a very pleasing appearance to the dentist's office. There are no pipes or the like extending into the cuspidor which could become dirty. All the surfaces are continuously cleansed by the water entering into the cuspidor.

It is apparent from the foregoing that there has been provided a cuspidor which has an integral water inlet opening which has many desirable features. It is of a type which can be readily incorporated in a dental console to give a very pleasing appearance to the dental console. It should be apparent that although the present invention has been described in conjunction with a cuspidor for use in a dental console, the same principles could be utilized for wash basins in a bathroom in which the wash basins would be mounted on a counter. Thus, the self-cleaning action could be provided in a home which would be particularly desirable when the teeth are being brushed and other operations are being carried out in the wash bowl.

I claim:

1. A receptacle for use with a counter having an opening therein, the receptacle comprising a bowl having an open top side adapted to be placed in alignment with the opening in the counter, a generally horizontal bottom wall and an upwardly extending, outwardly inclined annular side wall, formed integrally with the bottom wall, said bottom wall being formed with a drain opening therein to permit liquid to drain from the bowl and having a top surface which has an annular convex portion sloping downwardly toward the drain opening in one direction and sloping downwardly toward the annular side wall in the opposite direction to form an annular trough between the side wall and the convex annular surface in which liquid can travel, said bowl being formed with an integral protuberance adjacent said side wall also adjacent said bottom wall said protuberance having a curved side surface upwardly and outwardly inclined form the bottom wall and facing inwardly toward the center of the bowl with a radius shorter than that of the annular side wall, said protuberance, having a hole formed therein opening into the bowl, and facing in a direction so that liquid introduced through said hole in said protuberance will exit as a stream striking the side wall in a generally tangential direction and pass into said annular trough so that the liquid will swirl as a thin film around the interior of the bowl generally covering the exposed inner surface of the bowl.

2. A receptacle as in claim 1 wherein said top surface of the bottom wall is formed to provide an additional annular trough between the first named annular trough and the convex top surface.

3. In the combination of a counter and a receptacle, the counter having a generally planar top surface having an opening therein, a cuspidor secured to said counter and having an open top side, said cuspidor having a bottom wall and an upwardly extending, outwardly inclined annular side wall, said bottom wall forming a bowl having an annular convex internal shape and a centrally located drain opening formed therein, a protuberance extending from the bottom wall adjacent to the side wall having a curved surface upwardly and outwardly inclined from the bottom wall and facing inwardly toward the center of the bowl with a radius shorter than that of the annular side wall, said protuberance having an opening facing in a direction so that a liquid introduced into the bowl through the opening in said protuberance will exit as a stream striking the annular side wall in a generally tangential direction so that the liquid will swirl around the bowl in a thin film covering the inner exposed surface of the bowl before exiting through the drain opening, said cuspidor being formed integral with said counter, said counter being provided with an annular portion which extends over the cuspidor to serve as a lip to prevent liquid from passing up out of the cuspidor.

4. In a dental console, a cabinet, a counter mounted on said cabinet and having a generally planar surface with an opening therein, said planar surface extending a substantial distance in all directions from said opening, said cabinet being free of all raised surfaces extending above the planar surface of the counter, a cuspidor mounted in the cabinet and disposed below the opening in the counter, said cuspidor having an open top side, said cuspidor being formed with a bottom wall and upwardly extending, outwardly inclined annular side wall forming a bowl, said bottom wall being formed with a drain opening therein to permit the liquid to drain from the cuspidor, an annular trough formed at the juncture of said bottom and side walls, a protuberance extending from said annular trough having a curved surface facing towards the center of the bowl with a radius shorter than that of said annular side wall, said bowl having an additional opening formed through said protuberance and facing in a direction so that liquid introduced into the bowl through the opening will pass from the opening and strike the side wall in a generally tangential direction so that the water will swirl around the bowl in a thin film and into the annular trough before exiting through the drain opening, drain means within the cabinet making connection with the drain opening for collecting water passing through the drain opening, and means for supplying water under pressure to said additional opening in said protuberance.

5. A dental console as in claim 4 wherein said counter and cuspidor are formed integrally with each other and wherein said counter is provided with a portion extending over the top of the cuspidor which serves as a lip for the cuspidor to prevent water from swirling upwardly out of the cuspidor, together with an additional annular trough formed on said bottom wall adjacent to and having a radius shorter than said first named annular trough, wherein said curved surface projects upwardly and outwardly on said cuspidor protuberance and forms a portion of the outer edge of said additional annular trough serving to direct the thin film of water over substantially the entire internal surface of said cuspidor.

6. A dental console as in claim 4 together with a plurality of dental instruments mounted in the dental console.

* * * * *